April 18, 1961 W. J. POPOWSKY 2,980,861

SWITCHING SYSTEMS

Filed Aug. 27, 1957 3 Sheets-Sheet 1

INVENTOR.
WILLIAM J. POPOWSKY

BY Arthur H. Swanson

ATTORNEY.

*INVENTOR.*
WILLIAM J. POPOWSKY

BY Arthur H. Swanson

ATTORNEY.

April 18, 1961 W. J. POPOWSKY 2,980,861

SWITCHING SYSTEMS

Filed Aug. 27, 1957 3 Sheets-Sheet 3

INVENTOR.
WILLIAM J. POPOWSKY
BY Arthur H. Swanson
ATTORNEY.

United States Patent Office 2,980,861
Patented Apr. 18, 1961

2,980,861

SWITCHING SYSTEMS

William J. Popowsky, Wheaton, Md., assignor to Minneapolis-Honeywell Regulator Company, a corporation of Delaware Filed Aug. 27, 1957, Ser. No. 680,509

5 Claims. (Cl. 330—10)

This invention relates to electronic circuits, and more particularly to switching systems suitable for use in multiplex sampling of low-level signals.

It frequently has been found desirable to be able to switch between a plurality of low-level signals to apply samples of those signals to the input of a single instrumentality. This is particularly true in the field of instrumentation where it is often desirable to be able to multiplex the signals from a plurality of primary sensing elements, such as thermocouples, into the input of a single recording, controlling or indicating instrument. These signals are most frequently direct current or voltage signals. Although these signals have been successfully switched by mechanical means, it is increasingly important that switching means involving no mechanical movements be provided. Here, too, electronic switching means have been provided, however, these switching means include systems wherein the signal to be measured is passed through the switching tube. At the signal levels encountered in these circuits, considerable noise signals are introduced into the system and superimposed onto the data singals. To amplify the data signals prior to switching would require a separate amplifier for each of the channels being sampled. When there are a number of such channels being sampled, the expense of the separate amplifiers for each channel would be appreciable if not prohibitive.

It is, accordingly, an object of this invention to provide an improved switching system suitable for use with low-level signals.

It is another object of this invention to provide an improved multiplexing system for low-level signals.

It is a further object of this invention to provide an improved switching system for low-level signals wherein switching is accomplished without the use of movable mechanical members.

It is a still further object of the present invention to provide an improved switching system for low-level signals wherein electronic switching means are employed, and wherein the data signal is not required to pass through the electronic switching tube.

It is yet another object of this invention to provide a switching system as set forth which features isolated inputs, that is, where there is no D.C. connection between the inputs of the system and the output.

In accomplishing these and other objects, there has been provided, in accordance with the present invention, an improved multiplexing means for low-level signals which includes magnetic modulator means for converting the signals being sampled into alternating current signals, a diode gate for each sampled channel, and means for normally biasing the diode gate closed. An electronic switching tube circuit is employed to selectively and sequentially unblock the gate to permit the sampled signals to pass to an amplifier.

A better understanding of this invention may be had from the following detailed description when read in connection with the accompanying drawings, in which.

Figure 1:
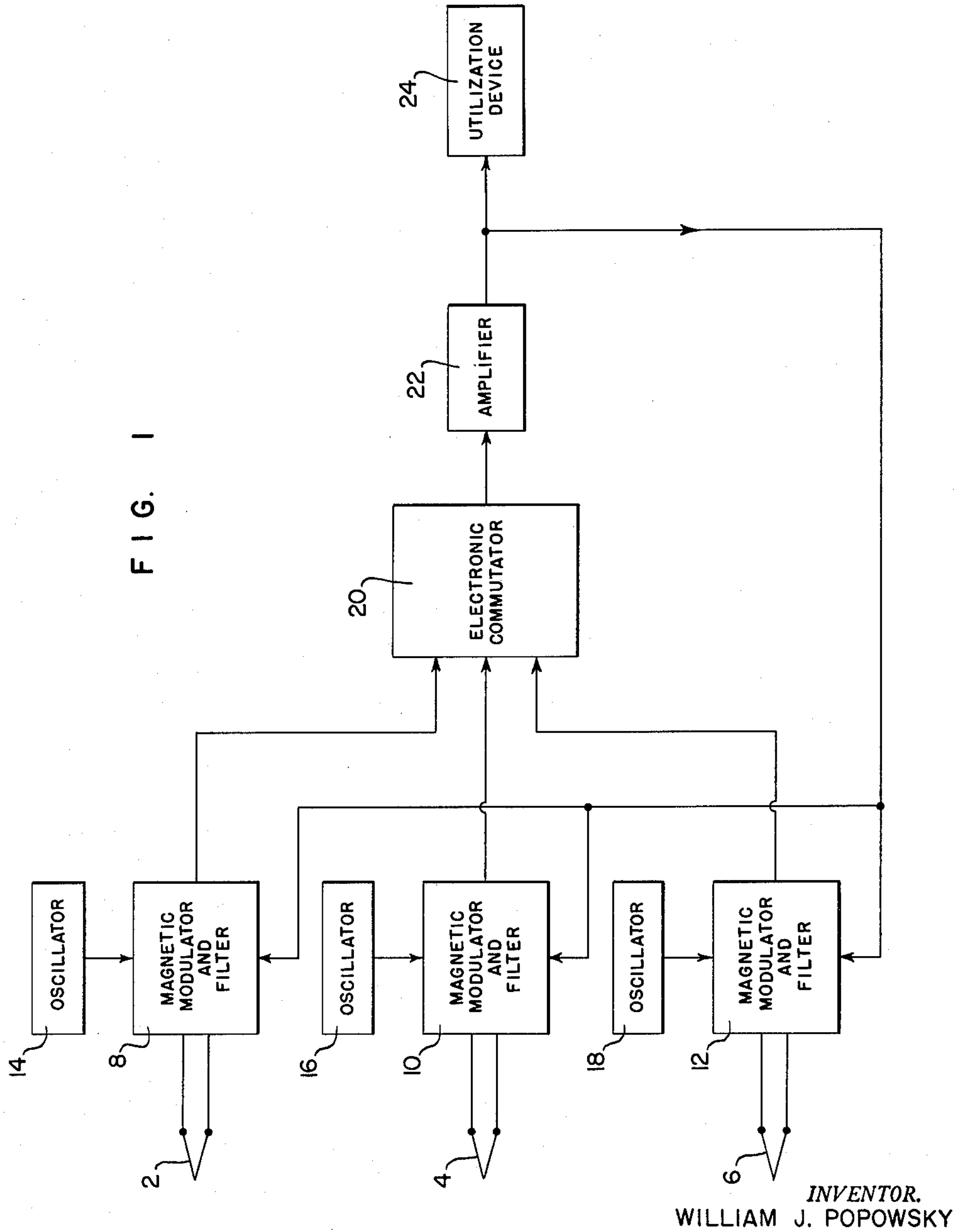
Fig. 1 is a schematic block diagram illustrating a system embodying the present invention.

Referring now to the drawings in more detail, there is shown in Fig. 1 a multiplexing system which includes a plurality of thermocouples 2, 4 and 6 which are representative of means providing low-level signal sources. Each of the thermocouples is connected to a corresponding magnetic modulator and filter circuit 8, 10 and 12, respectively. These magnetic modulator circuits may comprise magnetic modulators similar to those shown in the copending application of William A. Rote, Serial No. 470,097, filed November 19, 1954, now Patent No. 2,882,352, granted April 14, 1959, and will be more fully explained hereinbelow. The magnetic modulator 8 is supplied with oscillatory carrier frequency excitation from an oscillator 14. Similarly, an oscillator 16 supplies excitation to the modulator 10, and an oscillator 18 supplies excitation to the modulator 12. Although separate oscillators have been shown for each of the magnetic modulator units, it will be understood that a single oscillator may be coupled to supply excitation simultaneously to all of the modulators. The modulators convert the D.C. input signals into corresponding alternating signals, the amplitude and phase of which vary in accordance with the magnitude and direction of change in the input signals. The output of each of the magnetic modulators is fed to an electronic commutating arrangement 20. The electronic commutator sequentially and selectively connects the several outputs of the modulators to an amplifier 22, which includes means for demodulating the signal, reconverting it to a D.C. signal. The output of the amplifier is fed to a suitable utilization device 24 which may be a controller, a recorder or an indicator. The output of the amplifier is also connected in feedback relationship to all of the magnetic modulators 8, 10 and 12. This feedback connection provides the usual D.C. stabilization for the D.C. amplification of the particular channel which is momentarily connected through the commutator 20 to the amplifier 22. Although the same feedback connection is made simultaneously to all of the modulators, it is of significance only in that channel which is connected, at the time, to the amplifier.

Figure 2:
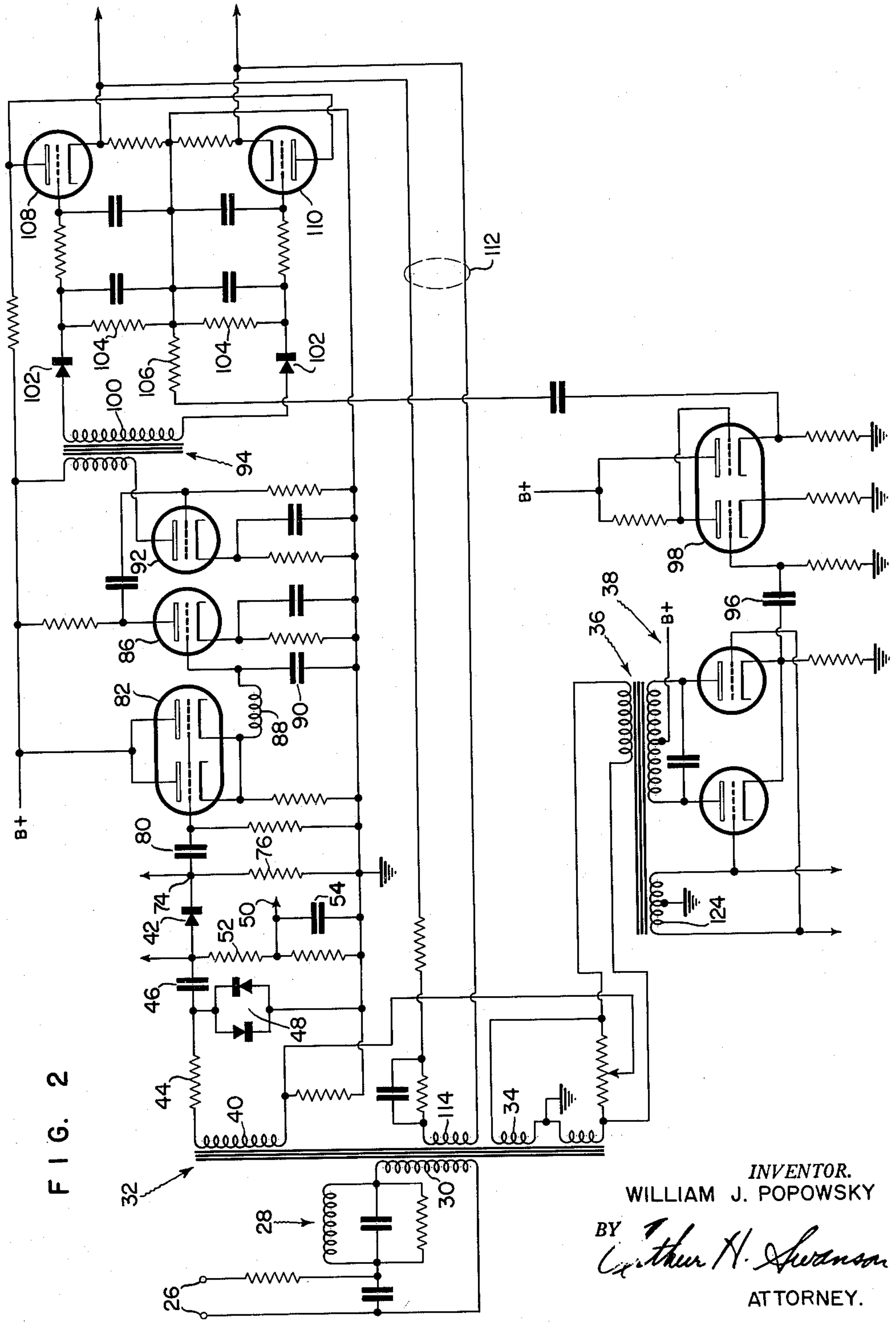
Fig. 2 is a schematic circuit diagram showing details of one channel of the apparatus illustrated in Fig. 1.

In Fig. 2, there is shown a circuit diagram illustrating circuit elements which may be used in the present invention as illustrated in block diagram in Fig. 1. For purposes of simplicity of explanation, a single input channel is shown. However, since each of the other channels is identical with the illustrated channel, the showing of the additional channels is felt to be unnecessary for this description. The D.C. signal input may be connected to the input circuit terminals 26 and fed through a filter 28 to the input winding 30 of a magnetic modulator 32. The characteristic operation of the magnetic modulator is such that the output signal will be of a frequency which is the second harmonic of the frequency of the exciting current. The filter 28 in the input circuit is tuned to this second harmonic frequency to prevent this signal from being reflected into the circuit of the primary sensing element connected to the terminals 26.

The magnetic modulator 32 is provided with an exciting winding 34 which is energized through a transformer 36 from an oscillator 38. An output winding 40 is also provided for the magnetic modulator. The signal developed in the output winding 40 is applied to the input of a diode gate which includes the diode 42. Between the winding 40 and the diode 42, there is positioned a signal limiter comprising the resistor 44, a coupling capacitor and the shunt connected diodes 48. This limiter is arranged to minimize interaction between or among the several input channels. Means are provided for normally biasing the diode 42 to a non-conductive condition. This means includes a connection to a source of low potential negative D.C. voltage represented by the arrow 50. This is applied to the voltage divider 52 to apply a negative bias on the diode. A shunt capacitor 54 provides for filtering an A.C. component from this bias source. The negatively biased electrode of the diode 42 is coupled to one of the plurality of cathodes 56 of the cold cathode counting tube 58, shown in Fig. 3. These counting tubes are characterized in that the conductive path is provided between the anode 60 thereof and a selected one of the plurality of cathodes. When properly triggered, the tube may be arranged to cause the conductive path to proceed sequentially, on a predetermined time base, from one cathode to the next.

Figure 3:
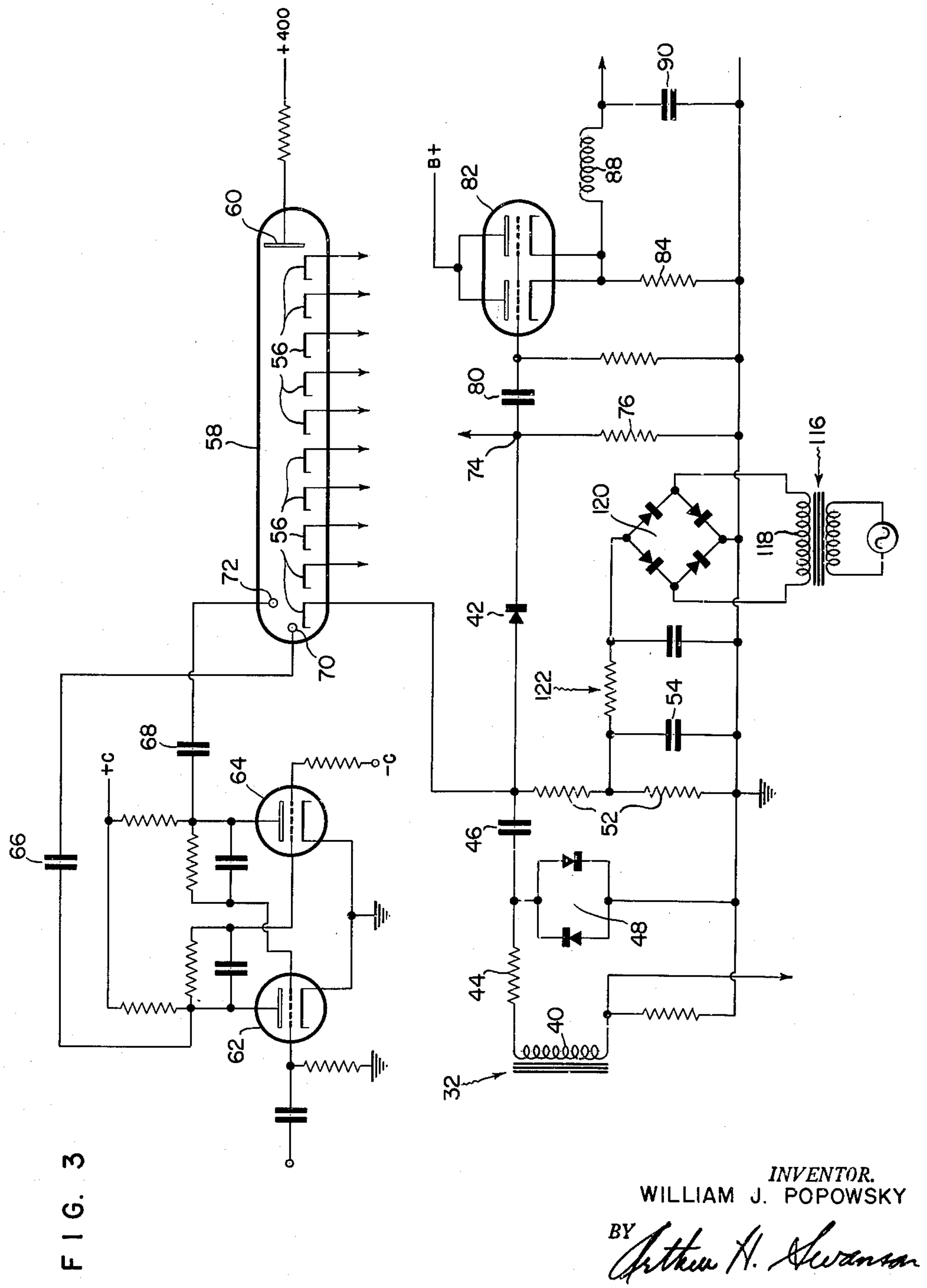
Fig. 3 is a schematic circuit diagram showing details of an electronic switch such as may be used in the structure illustrated in Fig. 1.

In Fig. 3, there is illustrated a suitable means for effecting the sequential triggering of the counting tube. This triggering means includes a pair of electron tubes 62 and 64 connected in a circuit to constitute a monostable multivibrator. The dual output of the multivibrator is connected through capacitors 66 and 68, respectively, to the control electrodes 70 and 72 of the counting tube 58. Although these control electrodes 70 and 72 are schematically represented as being only two in number, there are, in fact, two such electrodes for each of the cathodes 56. Since, however, corresponding ones of these electrodes are connected in parallel, the single schematic showing is sufficient for the purpose of this disclosure. The alternate keying of these control electrodes causes the conductive path in the tube 58 to step sequentially from cathode to cathode.

Referring to Figs. 2 and 3, it may be seen that the current flow in the cathode circuit of the tube 58 causes a potential to appear across the resistance network constituting the voltage divider 52. This potential is of a polarity opposite to the bias applied to the diode 42 and of a magnitude to neutralize the effect of such blocking bias and put a forward bias on diode 42. Thus, the current flow in the appropriate cathode circuit of the tube 58 unblocks the diode gate 42 allowing the signal developed by the output winding 40 to be applied to the amplifier circuit. As previously mentioned, in Figs. 2 and 3, there is illustrated but a single input circuit which is representative of the several circuits which may be connected in accordance with the present invention for selective sampling. It will be recalled that one of the features of the present invention is to permit several input signals to be sequentially applied to the input of a single amplifier. The signal from the several input circuits is applied at the junction 74 across the resistor 76, the connections to the other input circuits being represented by the arrow 78.

While all of the input circuits are premanently and directly connected to the junction 74, only one at a time will be effective since only one gate will be unblocked by current flowing in the cathode circuits of the tube 58. These several input circuits are connected through the coupling capacitor 80 to the input of a first amplifier stage which comprises a dual triode 82 in which the corresponding electrodes are connected in parallel. This first stage is provided with a cathode follower output taken across the cathode resistor 84 and applied to the grid of the next amplifier stage 86. The input to the amplifier 86 includes a tuned circuit consisting of an inductance coil 88 and a capacitor 90 which is arranged for the rejection of signals other than the second harmonic of the excitation energy applied to the magnetic modulator 32. The output of the amplifier 86 is capacitively coupled to the input of the power amplifier 92. A synchronous demodulator circuit is coupled to the output of the power stage 92 through a transformer 94.

A reference signal is obtained from the oscillator 38 for the synchronous operation of the demodulator. This signal is taken from the cathode circuit of the push-pull oscillator and constitutes a second harmonic of the fundamental frequency of the oscillator. This signal is applied through a coupling capacitor 96 to the input of a two stage amplifier 98. The demodulator includes the secondary winding 100 of the transformer 94, a pair of diode rectifiers 102, and a pair of resistors 104. The reference signal from the amplifier 98 is applied through a load resistor 106 to the junction between the two resistors 104. The output of this demodulator is a D.C. signal, the polarity and magnitude of which is dependent upon the polarity and magnitude of the input signal applied to the magnetic modulator. This demodulated signal is applied in push-pull fashion to the input of a pair of output D.C. amplifiers 108 and 110, the output of which is applied to whatever utilization device is required. The output of the D.C. amplifier is also coupled through a pair of leads 112 to a feedback winding 114 on the magnetic modulator 32 to stabilize the operation of the circuit in the usual manner of negative feedback applications.

In Fig. 3, the source of D.C. bias potential 50 is illustrated as comprising a transformer 116, the primary of which is coupled to an A.C. power supply. The secondary 118 of the transformer 116 is adjusted to give a suitable low voltage output. The output of the secondary is connected to a diode bridge rectifier 120. The D.C. output of the bridge 120 is applied through a filter 122 to the voltage divider 52.

As was previously noted, separate oscillators may be employed to supply the excitation to the individual magnetic modulators or a single oscillator may be appropriately coupled to supply the excitation for all of the magnetic modulators. In the event that there are provided individual oscillators for each of the magnetic modulators, then the oscillators may be synchronized by connecting a synchronizing winding 124 on the oscillator transformer 36 in parallel with the corresponding winding of the other several oscillators.

Thus, it may be seen that there has been provided an improved switching system suitable for multiplexing low-level signals wherein electronic switching means are employed and without requiring that the data signals be passed through an electronic switching tube and yet providing for the isolation of the inputs.

What is claimed is:

1. An electronic switching system for low-level signals comprising, in combination, a plurality of signal input circuits, a magnetic modulating means coupled to each of said input circuits for modulating input signals in accordance with a modulator exciter frequency, an output amplifier, means providing a coupling path between each of said modulating means and said output amplifier, control means in each of said paths, each of said control means including a diode and means for normally biasing said diodes to block the passage of signals in said paths, an electronic counting tube having an anode and a plurality of cathodes, means for energizing said counting tube to develop a conductive path between said anode and one of said cathodes, and means for shifting said conductive path sequentially from cathode to cathode, each of said control means being coupled to the cathode circuit of a separate one of said cathodes of said counting tube whereby to modify the bias condition on said control means selectively and sequentially in accordance with the position of said conductive path in said counting tube to unblock corresponding ones of said paths.

2. An electronic switching system for low-level signals comprising, in combination, a plurality of signal input circuits, a magnetic modulating means coupled to each of said input circuits, for modulating input signals in accordance with a modulator exciter frequency, said modulating means comprising a magnetic core structure having thereon a balanced pair of exciting windings, an input winding and an output winding, an output amplifier, means providing a coupling path between each of said output windings and said amplifier, control means in each of said paths, each of said control means including a diode and means for normally biasing said diode to block the passage of signals in said paths, an electronic counting tube having an anode and a plurality of cathodes, means for energizing said counting tube to develop a conductive path between said anode and one of said cathodes, and means for shifting said conductive path sequentially from cathode to cathode, each of said control means being coupled to the cathode circuit of a separate one of said cathodes of said counting tube whereby to modify the bias condition on said control means selectively and sequentially in accordance with the position of said conductive path in said counting tube to unblock corresponding ones of said paths.

3. An electronic switching system for low-level signals comprising, in combination, a plurality of signal input circuits, a magnetic modulating means coupled to each of said input circuits for modulating input signals in accordance with a modulator exciter frequency, an output amplifier, means providing a coupling path between each of said modulating means and said output amplifier, control means in each of said paths, each of said control means including a diode and means for normally biasing said diodes to block the passage of signals in said paths, an electronic counting tube having an anode and a plurality of cathodes, means for energizing said counting tube to develop a conductive path between said anode and one of said cathodes, means for shifting said conductive path from cathode to cathode, each of said control means being coupled to the cathode circuit of a separate one of said cathodes of said counting tube whereby to modify the bias condition on said control means selectively and sequentially in accordance with the position of said conductive path in said counting tube to unblock corresponding ones of said paths, and demodulating means coupled to the output of said amplifier to provide demodulated output signals which are representative of the input signals.

4. An electronic switching system for low-level signals comprising, in combination, a plurality of signal input circuits, a magnetic modulating means coupled to each of said input circuits for modulating input signals in accordance with a modulator exciter frequency, said modulating means comprising a magnetic core structure having thereon a balanced pair of exciting windings, an input winding and an output winding, an output amplifier, means providing a coupling path between each of said output windings and said amplifier, control means in each of said paths, each of said control means including a diode and means for normally biasing said diode to block the passage of signals in said paths, an electronic counting tube having an anode and a plurality of cathodes, means for energizing said counting tube to develop a conductive path between said anode and one of said cathodes, means for shifting said conductive path sequentially from cathode to cathode, each of said control means being coupled to the cathode circuit of a separate one of said cathodes of said counting tube whereby to modify the bias condition on said control means selectively and sequentially in accordance with the position of said conductive path in said counting tube to unblock corresponding ones of said paths, and a synchronous demodulating means coupled to the output of said amplifier to provide demodulated output signals which are representative of the input signals.

5. An electronic switching system for low-level signals comprising, in combination, a plurality of signal input circuits, a magnetic modulating means coupled to each of said input circuits for modulating input signals in accordance with a modulator exciter frequency, said modulating means comprising a magnetic core structure having thereon a balanced pair of exciting windings, an input winding, an output winding and a feedback winding, an output amplifier, means providing a coupling path between each of said output windings and said amplifier, control means in each of said paths, each of said control means including a diode and means for normally biasing said diode to block the passage of signals in said paths, an electronic counting tube having an anode and a plurality of cathodes, means for energizing said counting tube to develop a conductive path between said anode and one of said cathodes, means for shifting said conductive path sequentially from cathode to cathode, each of said control means being coupled to the cathode circuit of a separate one of said cathodes of said counting tube whereby to modify the bias condition on said control means selectively and sequentially in accordance with the position of said conductive path in said counting tube to unblock corresponding ones of said paths, a synchronous demodulating means coupled to the output of said amplifier to provide demodulated output signals which are representative of the input signal, and means coupling said output signals in negative feedback relationship to said feedback winding on all of said modulating means.

References Cited in the file of this patent

UNITED STATES PATENTS

| | | |
|---|---|---|
| 1,847,079 | Burton | Mar. 1, 1932 |
| 2,297,543 | Eberhardt et al. | Sept. 29, 1942 |
| 2,444,726 | Bussey | July 6, 1948 |
| 2,485,343 | Zuschlag | Oct. 18, 1949 |
| 2,568,779 | Veaux | Sept. 25, 1951 |
| 2,697,746 | Kennedy | Dec. 21, 1954 |
| 2,723,307 | Baracket et al. | Nov. 8, 1955 |
| 2,773,982 | Trousdale | Dec. 11, 1956 |
| 2,806,175 | Hansen | Sept. 10, 1957 |